(12) United States Patent
Marr et al.

(10) Patent No.: US 10,630,322 B2
(45) Date of Patent: Apr. 21, 2020

(54) HIGH POWER SIGNAL COMMUNICATIONS WITHIN A POWER LIMIT

(71) Applicant: RAYTHEON COMPANY, Waltham, MA (US)

(72) Inventors: Harry B. Marr, Manhattan Beach, CA (US); Daniel Thompson, Hermosa Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/974,446

(22) Filed: May 8, 2018

(65) Prior Publication Data

US 2020/0028529 A1    Jan. 23, 2020

(51) Int. Cl.
*H04B 1/04* (2006.01)
*H04B 7/10* (2017.01)

(52) U.S. Cl.
CPC .................. *H04B 1/04* (2013.01); *H04B 7/10* (2013.01); *H04B 2001/0416* (2013.01)

(58) Field of Classification Search
CPC ...... H04B 7/0617; H04B 7/0408; H04B 1/04; H04B 7/10; H04B 2001/0416; H04W 16/28; H01Q 3/26
See application file for complete search history.

(56) References Cited

U.S. PATENT DOCUMENTS 5,347,283 A    9/1994  Krizek et al.
6,243,565 B1 *  6/2001  Smith .................... H04B 1/713
                                                    375/299

2007/0046539 A1 *  3/2007  Mani ...................... H01Q 3/26
                                                    342/383

(Continued)

FOREIGN PATENT DOCUMENTS

WO    WO 2017/197096 A1    11/2017
WO    WO 2018/022182 A1     2/2018

OTHER PUBLICATIONS

Bilich, Carlos G., "Bio-Medical Sensing using Ultra Wideband Communications and Radar Technology: A Feasibility Study," Pervasive Health Conference and Workshops, IEEE, Jun. 15, 2006, 9 pages.

(Continued)

*Primary Examiner* — Yuwen Pan
*Assistant Examiner* — Fatuma G Sherif
(74) *Attorney, Agent, or Firm* — Lewis Roca Rothgerber Christie LLP

(57) ABSTRACT

An RF communication system includes a wideband receiver for receiving an RF signal; a wideband receive signal path for processing the received RF signal, a wideband transmit signal path for processing a transmit RF signal to be transmitted; a wideband transmitter for transmitting the transmit RF signal at a selected transmit frequency and a selected transmit polarization; and a processor for controlling a plurality of beam forming circuits for performing signal processing and waveform generation, wherein the processor maximizes an effective radiated power (ERP) of the communication system within a predetermined ERP limit by switching the wideband transmitter between at least one of multiple transmit frequencies and multiple transmit polarizations to form an aggregate, time-averaged signal as the transmit RF signal.

18 Claims, 4 Drawing Sheets

(56) References Cited

U.S. PATENT DOCUMENTS

| 2008/0242239 A1* | 10/2008 | Wilson | H04B 1/0007 |
| | | | 455/83 |
| 2014/0064339 A1* | 3/2014 | Kim | H04L 5/0051 |
| | | | 375/219 |
| 2014/0080549 A1* | 3/2014 | Li | H04W 52/52 |
| | | | 455/571 |
| 2017/0290011 A1 | 10/2017 | Kushnir et al. | |

OTHER PUBLICATIONS

Mercier et al., "Ultra-Low-Power UWB for Sensor Network Applications," Circuits and Systems, 2008. ISCAS 2008. IEEE International Symposium on. IEEE, 2008.
International Search Report for corresponding International Application No. PCT/US2019/030014, filed Apr. 30, 2019, International Search Report dated Oct. 18, 2019 and dated Oct. 25, 2019 (5 pgs.).
Written Opinion of the International Searching Authority for corresponding International Application No. PCT/US2019/030014, filed Apr. 30, 2019, Written Opinion of the International Searching Authority dated Oct. 25, 2019 (7 pgs.).

* cited by examiner

HIGH POWER SIGNAL COMMUNICATIONS WITHIN A POWER LIMIT

FIELD OF THE INVENTION

The present invention relates generally to signal communication and more specifically to high power signal communications within a predetermined power limit, such as a FCC ERP limit.

BACKGROUND

Radars typically use high power radio waves and their reflections (radar signals) to determine the range, angle, or velocity of objects. A typical radar system includes a transmitter that generates electromagnetic waves in the radio or microwaves domain, an antenna, a receiver and one or more processors to determine properties of the objects from the transmitted radio waves (pulsed or continuous) reflecting off the object and returning to the receiver.

Currently, radars are being used in many military and commercial fields, such as air and terrestrial traffic control, radar astronomy, air-defense systems, marine radars to locate landmarks and other ships, aircraft anti-collision systems, ocean surveillance systems, outer space surveillance, meteorological precipitation monitoring, altimetry and flight control systems, ground-penetrating radar for geological observations, and range-controlled radar for public health surveillance, among others. Radar signals are typically high frequency (1-100 GHz) signals and therefore generate a substantial amount of electromagnetic power, such as effective radiated power (ERP), which is defined as radio frequency (RF) power, such as that emitted by a radio transmitter. ERP measures the combination of the power emitted by the transmitter and the ability of an antenna to direct that power in a given direction. ERP is equal to the input power to the antenna multiplied by the gain of the antenna. ERP is used in electronics and telecommunications to quantify the apparent power of a transmitting station as experienced by a listening receiver in its reception area.

Similarly, 5th generation (5G) wireless systems, which are the proposed next telecommunications standards, also require a substantial amount of energy.

Typically, radio transmissions require a Federal Communications Commission (FCC) license. However, in recent decades, the FCC has also opened some spectrum bands for unlicensed operations, mostly restricting them to low ERP levels. Nevertheless, unlicensed devices, such as most radio transmission equipment, must still receive technical approval from the FCC before being sold or used, including compliance with FCC power limits. Normally, most of the relevant FCC rules specify power and/or emission limits in terms of the transmitter system (transmitter, radiating antenna, and cable connector) ERP. For example, Table 1 below shows some ERP limits for wireless communications between 450-470 MHz for a specific service area radius.

TABLE 1

| Maximum ERP | | | | | | | | | | |
|---|---|---|---|---|---|---|---|---|---|---|
| | Service area radius (km) | | | | | | | | | |
| | | 3 | 8 | 13 | 16 | 24 | 32 | 40 | 48 | 64 | 80 |
| Maximum ERP (W) | | 2 | 100 | 500 | 500 | 500 | 500 | 500 | 500 | 500 | 500 |

Accordingly, the FCC restricts the utilization of radar and high power wireless communications in commercial spaces (e.g., non-warzones) due to strict limits on ERP of any wireless system. However, many government (e.g., military) and commercial applications (e.g., 5G wireless systems) need to operate radar and communications at high power in these environments.

Current approaches include violating FCC limits with high power wireless transmission, or using low power wireless transmission, which limits the usefulness of the wireless system.

SUMMARY

In some embodiments, the disclosed invention is an RF communication system that includes a wideband receiver for receiving an RF signal; a wideband receive signal path for processing the received RF signal, a wideband transmit signal path for processing a transmit RF signal to be transmitted; a wideband transmitter for transmitting the transmit RF signal at a selected transmit frequency and a selected transmit polarization; and a processor for controlling a plurality of beam forming circuits for performing signal processing and waveform generation, wherein the processor maximizes an effective radiated power (ERP) of the communication system within a predetermined ERP limit by switching the wideband transmitter between at least one of multiple transmit frequencies and multiple transmit polarizations to form an aggregate, time-averaged signal as the transmit RF signal.

In some embodiments, the disclosed invention is an RF communication method that includes receiving an RF signal by a wideband receiver, processing the received RF signal by a wideband receive signal path; processing a transmit RF signal to be transmitted by a wideband transmit signal path; transmitting the transmit RF signal at a selected transmit frequency and a selected transmit polarization by a wideband transmitter; controlling a plurality of beam forming circuits for performing signal processing and waveform generation; and maximizing an effective radiated power (ERP) of the communication system within a predetermined ERP limit by switching the wideband transmitter between at least one of multiple transmit frequencies and multiple transmit polarizations to form an aggregate, time-averaged signal as the transmit RF signal.

In some embodiments, the disclosed invention is an RF communication system that includes a wideband transmit signal path for processing a transmit RF signal to be transmitted; a wideband transmitter for transmitting the transmit RF signal at a selected transmit frequency and a selected transmit polarization; and a processor for maximizes an effective radiated power (ERP) of the RF signal to be transmitted within a predetermined ERP limit by: determining a time to switch the selected transmit frequency, as a function of a transmission power of the transmission system and the predetermined ERP limit, determining whether the transmission system is using different polarization schemes, when it is the time to switch the selected transmit frequency; switching the wideband transmitter to a new transmit frequency separated from the selected transmit frequency by a predetermined bandwidth, when it is determined that the transmission system is not using different polarization schemes; determining a time to switch the selected transmit polarization, as a function of a transmission power of the communication system and the predetermined ERP limit, when it is determined that the transmission system is using different polarization schemes; switching the wideband transmitter to the new transmit frequency, when it is not the time to switch the selected transmit polarization; and switching the wideband transmitter to a new transmit polarization, when it is the time to switch the selected transmit polarization, to transmit an aggregate, time averaged low power signal at rotating polarizations and frequencies, as the transmit RF signal, by the wideband transmitter.

In some embodiments, the predetermined ERP limit is an EPR limit set by the FCC. In some embodiments, a radar signal and a communications signal are combined by the wideband transmit signal path, and transmitted by the wideband transmitter.

BRIEF DESCRIPTION OF THE DRAWINGS

These and other features, aspects, and advantages of the present invention will become better understood with regard to the following description, appended claims, and accompanying drawings.

DETAILED DESCRIPTION

In some embodiments, the disclosed invention uses a spread spectrum time phased process that takes advantage of frequency diversity and the time phased nature of how the FCC ERP limit is measured to stay under the FCC limit, while still radiating at an effective high power. In some embodiments, the disclosed invention maximizes ERP to provide a much higher ERP than a frequency stationary system, while staying under FCC imposed ERP limits. In some embodiments, the disclosed invention transmits an aggregate, time averaged low power output at rotating polarizations and frequencies, utilizing, for example, a wideband digital phases array architecture to enable the frequency agility of the transmission system.

For example, a radar system requires a sufficient frequency agility to quickly shift its operating frequency to account for atmospheric effects, jamming, interference with other sources, or to make it more difficult to locate the radar transmitter through radio direction finding. The disclosed invention uses novel signal processing techniques to collect the agile pulses. For example, the modulation schemes used by the transmitter is known at the receiver so that the pulses can be demodulated by the receiver.

Figure 1:
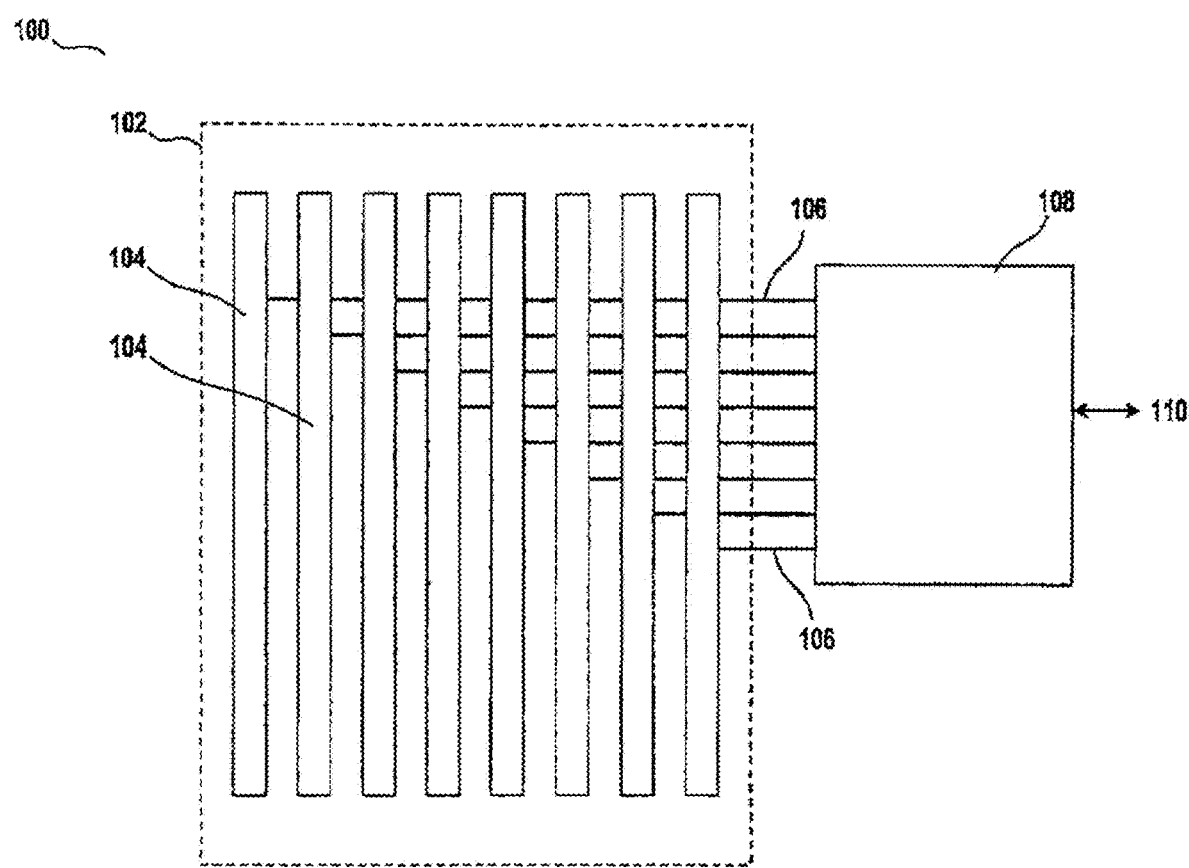
FIG. 1 shows a diagram of a conventional antenna array.

FIG. 1 shows a diagram of a conventional antenna array 100. The antenna array 100 includes several linear arrays 104 housed in a radome 102. Here, each linear array 104 is arranged vertically with spacing between each other, which is determined by the desired resonant frequency of the antenna array 100. Each linear array 104 is connected to its associated radio frequency (RF) electronics circuitry contained in an external RF electronics module 108, via an antenna feed 106. The RF electronics module 108 is connected to external systems via a connection 110 for power, control, and communications connections; and may be physically mounted on the radome 102, or may be located remotely or outside of the antenna array 100.

In some embodiments, the disclosed invention employs wideband, digital signals at every element of the arrays 104 to switch all the modulation aspects in an agile manner (e.g.,
at the nanosecond time scale, which is on the order of RF wavelengths.). Utilizing a spread spectrum time phased process provide the capability to transmit an RF signal on a bandwidth considerably larger than the frequency content of the original information.

Figure 2:
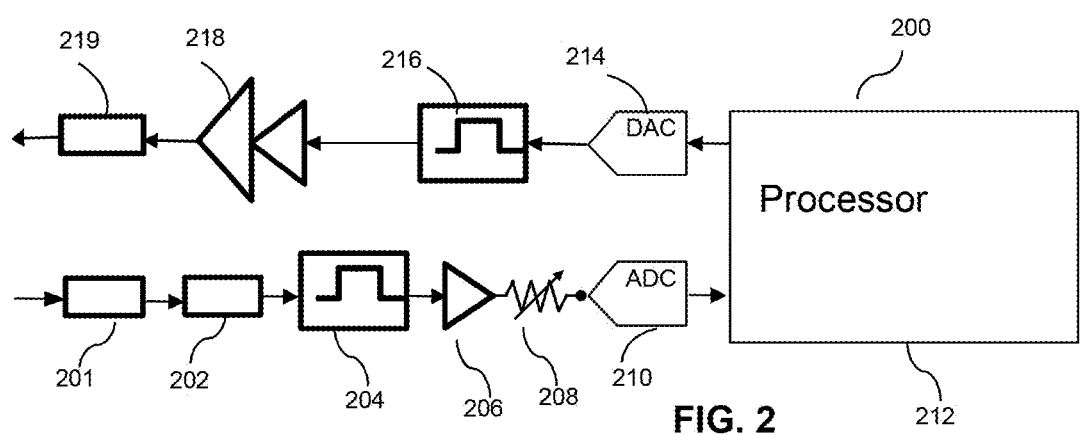
FIG. 2 shows a block diagram of a wideband transceiver, according to some embodiments of the disclosed invention.

FIG. 2 shows a block diagram of a wideband transceiver 200, according to some embodiments of the disclosed invention. The exemplary wideband transceiver (a receiver and a transmitter) 200 may be utilized by a radar system, such as an Electronically Scanned Array (ESA) radar or other high power RF communication systems. Although FIG. 2 depicts a single channel for simplicity reasons, one skilled in the art would recognize that there may be an array of such channels in a radar or other high power RF communication systems. As shown, a processor 212 controls the operations of a plurality of beam forming circuits in a receive mode and a transmit mode. Each beam forming circuit performs various signal processing and waveform generation tasks, controlled by the processor 212. In digital beamforming applications, often multiple carriers are required to be transmitted per element in the array. In some cases, two different signal types, such as a radar signal and a communications signal may be combined and transmitted by the wideband transceiver 200. In these cases, a wideband analog signal received by the wideband transceiver would include two or more carriers or signals.

A wideband receiver 201 receives an RF signal at it input port to be propagated through a wideband receive signal path. In some embodiments, the wideband receive signal path for a given channel may include an optional wideband limiter 202 to protect the receiver front end from high power signals. The limiter 202 also prevents the electronic components from breaking out, for example, from a signal jammer. As depicted, the receive signal path also includes a wideband bandpass filter 204 to separate the two or more carriers or signals, a wideband amplifier 206 to amplify the received analog signal from the bandpass filter 204, an optional Automatic Gain Controller (AGC) 208 to control input power to allow optimal input power into a wideband Analog-to-Digital Converter (ADC) 210, which converts the received analog signal to a digital signal for processing by processor 212. Processor 212 separates the carriers or signals and uses the carrier frequencies in the modulation scheme to obtain frequency diversity for spread spectrum waveforms.

For example, a radar system according to the disclosed invention may be using wide band orthogonal frequency and polarization division multiplexing waveforms to transmit at a high total power and still stay within FCC safety limits at a given frequency. Spread spectrum techniques is another way this can be accomplished. For instance, if Equation (1) below dictates that the total frequency extent of the system must be 3 GHz, then the radar system could transmit a 3 GHz wide spread spectrum waveform and comply with this requirement, instead of the orthogonal frequency and polarization division multiplexing techniques, which is where either the frequency or polarization switches at least every t time, again dictated by Equation (1).

Referring back to FIG. 2, a wideband transmit signal path for a given channel includes a wideband Digital-to-Analog Convertor (DAC) 214. DAC 214 converts the digital output from a respective beam forming circuit that is controlled by the processor 212 and converts it to an analog signal, which is then filtered by a bandpass filter 216 to separate the analog signal into two or more carriers or signals such that they can be amplified through a power amplifier 218 without intermodulation distortion and with correct amplitude and phase.

In some embodiments, the gain of the bandpass filter may 216 also be controlled by another AGC (not shown) to allow optimal input power into a high power amplifier 218 to keep it operating in its non-saturation mode. The output of the high power amplifier 218 is then transmitted out by a wideband transmitter 219, for example, via an antenna array. In some embodiments, the ADC 210 and DAC 214 are monobit ADC and DAC, respectively. To achieve wideband operation (>1 GHz), wideband ADC 210 and DAC 214 components need to operate at, at least this bandwidth. All the remaining components in the RF chain also need to be capable of operating at this bandwidth including a mixer and phase shifters if they are used for further signal processing in the system.

In some embodiments, the process according to the disclosed invention is executed by the processor 212 to transmit an aggregate, time averaged low power output at rotating polarizations and frequencies to enable the frequency agility of the transmission system. This approach of switching polarizations doubles the transmit power available to a radar while staying within FCC limits. The FCC limits are set primarily for human safety as the FCC ERP limits represent the limit of RF frequency power for which it is safe for the human body to absorb. Human body absorption and thus the FCC safety test measurements occur at a given electromagnetic polarization. For example, for two RF signals "A" and "B", if measured at the polarization of RF signal "A", then twice as much RF power will be measured for signal "A" as for signal "B," which is offset 45 degrees in polarization from signal "A" (i.e., effected by a 45 degrees phase shift of the signal). An RF signal "A" is measured at 100 times the RF power as a signal "B" which is offset 90 degrees in polarization (i.e., effected by a 90 degrees phase shift of the signal) from "A". As a result, by switching polarizations 90 degrees, often emitted at Horizontal polarization (H-pol) and Vertical polarization (V-pol), twice as much RF power can be emitted.

For example, suppose the FCC ERP limit for signal "A" is an average of 100 Watts over a 6 minute period, then a radar could transmit with signal "A" at 200 Watts at H-pol for 3 minutes and then switch pols and transmit for 200 Watts at V-pol for 3 minutes. This way, such radar meets the FCC 100 Watt over 6 minute ERP requirement, while being able to effectively transmit at 200 Watts.

In some embodiments, the disclosed invention switches a current frequency to another frequency at a certain time. It then switches the polarization, if the system is using dual polarization. This way, processor 212 generates an aggregate, time averaged low power output at rotating polarizations and frequencies from a received analog signal to be transmitted.

Although a dual polarization is described here as an example, those skilled in the art would recognize that there are many different polarization schemes that can be utilized by the disclosed invention, depending on the phasing of the horizontal and vertical components of the antenna. In other words, any arbitrary polarization scheme, where the circular polarization can be modulated at the starting reference at each pulse, can be utilized.

In most cases, FCC power limit is 50 W/m² over a six minutes window (e.g., at 10 GHz) or 5 mW/cm². The FCC limit is 2.5 M µV/m emission limit measured at 3 meters and at 10.5 GHz. Using the formula $P*G=0.3E^2$, where P is the power, G is the gain and E is the electric field strength, one can equate electric field strength to ERP, which is P times G. Substituting 2.5M µV/m for E, one obtains 1.875 W (2 dBW) effective isotropic radiated power (EIRP, also ERP for short) at 3 m away with a gain of 1. If gain is higher than 1, the total output power out must be lower than 1.875 W to comply with FCC limits.

For example, for low band, 6 KHz channels, assume a military grade system with 60 dBW of ERP is desired. In that case, FCC time limit is 360,000 milliseconds in which to time average 2 dBW of ERP for transmitted power, $P_i$ at duration $d_i$ at polarization coefficient $\rho_i$ $$\frac{\sum_i P_i \cdot d_i \cdot \rho_i}{360,000 \text{ ms}} = 2 \text{ W} \qquad (1)$$

Set i=1; $P_1$=60 dBW; $\rho_i$=1; $d_1$=0.72 ms; i=500,000i*6 kHz=3 GHz where $P_i$ is given and $\rho_i$ is the number of isolated polarizations that the hardware is capable of. This number $\rho_i$ is typically 1 for single polarization systems or 2 for polarization diverse systems where the hardware is capable of both H-pol and V-pol. Current military and long range radars typically transmit at 60 dBW and thus this transmit power is assumed in the above example.

Based on the above Equation (1), at the 60 dBW=P transmit power (ERP), a single polarization radar needs to switch 6 kHz frequency bands every 0.72 ms over a 3 GHz range. Similarly, a dual polarization radar needs to switch 6 kHz bands every 1.44 ms and switch poles every 0.72 ms. In general, the hardware modules can only transmit at an average power of 2 Watts at a given frequency and a given polarization, over a 6 minute period. Equation (1) shows that at 60 dBW ERP, the system needs to switch frequency or polarization every 0.72 milliseconds to average the ERP to about to 2 W of transmitted power, averaged over 6 minutes at a given frequency and a given polarization. If the ERP is cut by 50% to 57 dBW, then the system would have to switch either polarization or frequency every 1.44 ms to stay under FCC limits. Similarly, if the ERP again is cut by half to 54 dBW, then the system would need to switch every 2.88 ms to meet the FCC ERP limit.

As another example, a single polarization system might transmit at 60 dBW at 6 kHz from 0 seconds to 0.72 ms, at 12 kHz from 0.72 to 1.44 ms, at 18 kHz from 1.44 ms to 2.16 ms, and so forth, until the system is transmitting at 3 GHz at minute 6. This way, the system would never average more than 2 Watts of ERP at any given frequency over a 6 minute period. In the dual polarization system, a system would transmit 60 dBW of ERP at 6 kHz at H-pol from 0 seconds to 0.72 ms, then 6 kHz at V-pol from 0.72 to 1.44 ms, then at 12 kHz at H-pol from 1.44 ms to 2.16 ms and up through 1.5 GHz. In this way, the system would never average more than 2 Watts of ERP at any given frequency, at a given polarization over the 6 minute period, based on Equation (1).

Figure 3:
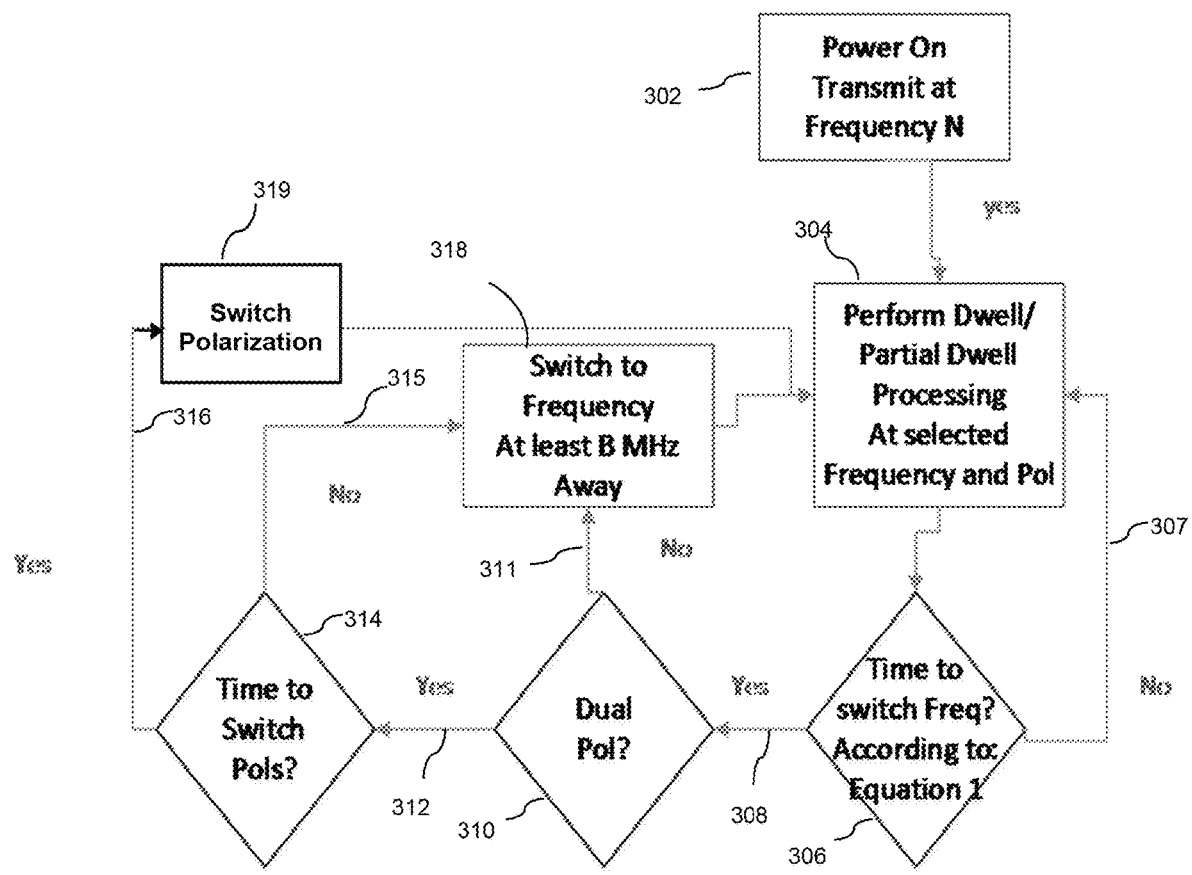
FIG. 3 is an exemplary process flow diagram, according to some embodiments of the disclosed invention.

FIG. 3 is an exemplary process flow diagram, according to some embodiments of the disclosed invention. In to some embodiments, FIG. 3 provides an example of the concept of a cost function to determine what the current or instantaneous power level is as compared to the FCC limit. As shown in block 302, a transceiver, for example the wideband transceiver 200 of FIG. 2, starts transmitting at a frequency N at the start up. In block 304, dwell or partial dwell processing is performed (e.g., by the processor 212) at a selected frequency and polarization. Dwell processing refers to the fact that a typical radar system must transmit multiple pulses, often many pulses, and process this batch of pulses together as a single dwell where standard radar range- Doppler processing techniques are applied to the dwell of pulses. A single range-Doppler map is then generated for each dwell. A dwell of pulses is transmitted at a single frequency and polarization, according to Equation (1), before the frequency and polarization are switched to comply with FCC limits. Signal processing techniques can also be applied to group pulses transmitted at different frequencies and polarizations into a single dwell to extend the dwell across frequencies. For example, if one partial dwell is transmitted at 6 kHz and another at 12 kHz, the first dwell can be downconverted when the pulses are received by 6 kHz and the second dwell can be downconverted when the pulses are received by 12 kHz and therefore placing both sets of pulses at a baseband (0 kHz) and processing the pulses from 6 kHz and 12 kHz as a single dwell, centered at 0 kHz.

As shown in block 306 and 314, it is decided whether it is time to switch the frequency or the polarization, respectively. If it is time to switch the frequency based on Equation (1) (line 308), the processor 212 checks to determine whether a dual polarization is being used by the system, in block 310. If it is not the time to switch the frequency (line 307), the processor 212 goes back to block 304 to perform dwell or partial dwell processing on the signal. When the system is utilizing a dual polarization mode in block 310 (line 312), the processor 212 checks to determine whether it is time to switch the polarization, in block 314. This determination is also performed according to Equation (1). If it is time to switch the polarization, processor 212 switches the polarization in block 319, before it goes back to block 304 to perform dwell or partial dwell processing on the signal. Again, it is advantageous to switch polarizations so the system switches frequencies less often, for example, only half as often. Switching polarization also allows the system to stay within FCC limits for a given ERP with half the operational frequency bandwidth.

If there is no dual polarization used (line 311) in block 310, or if it is not the time yet to switch the polarization (line 315) in block 314, the processor 212 switches the frequency to a new frequency at least "B" MHz away from the current frequency, in block 318. The "B" value is determined by FCC criteria and is typically a value of 6 kHz through the microwave frequency spectrum (up through 30 GHz). In other words, the FCC has essentially determined that 6 kHz is a sufficient bandwidth extent for signals at different frequencies to be isolated from one another. When it is time to switch the polarization (line 316) in block 314, or after the frequency is switched to the new frequency in block 318, the processor 212 goes back to block 304 to perform dwell or partial dwell processing on the signal.

Since the FCC limits are for a single polarization scheme, in some embodiments, the disclosed invention uses dual-polarization, for example, horizontal and vertical polarizations to transmit RF signal with twice the power. Likewise, if a circular polarization with some starting reference offset is utilized, then the polarization can be encoded into a circularly modulation sequence, further increasing the total ERP.

This wideband digital phase array architecture provides further frequency separation in the spread spectrum waveforms. Typically 3G signals have about 30-60 MHz of bandwidth, however with this new design, several GHz of bandwidth may be utilized. Also, the new design makes it possible to frequency hop signals coherently from 1 GHz to 10 GHz very quickly, which has not been previously possible with narrowband systems.

In some embodiments, the disclosed invention uses a code that describes the modulation scheme and adds one or more polarizations to the modulation scheme. That is, if the modulation scheme is known on transmit side, then the receiver on the other end can easily demodulate the modulated signal, providing the ability to quickly modulate in time, frequency, phase, amplitude and polarization, which have previously not been possible to be performed all at the same time.

Figure 4:
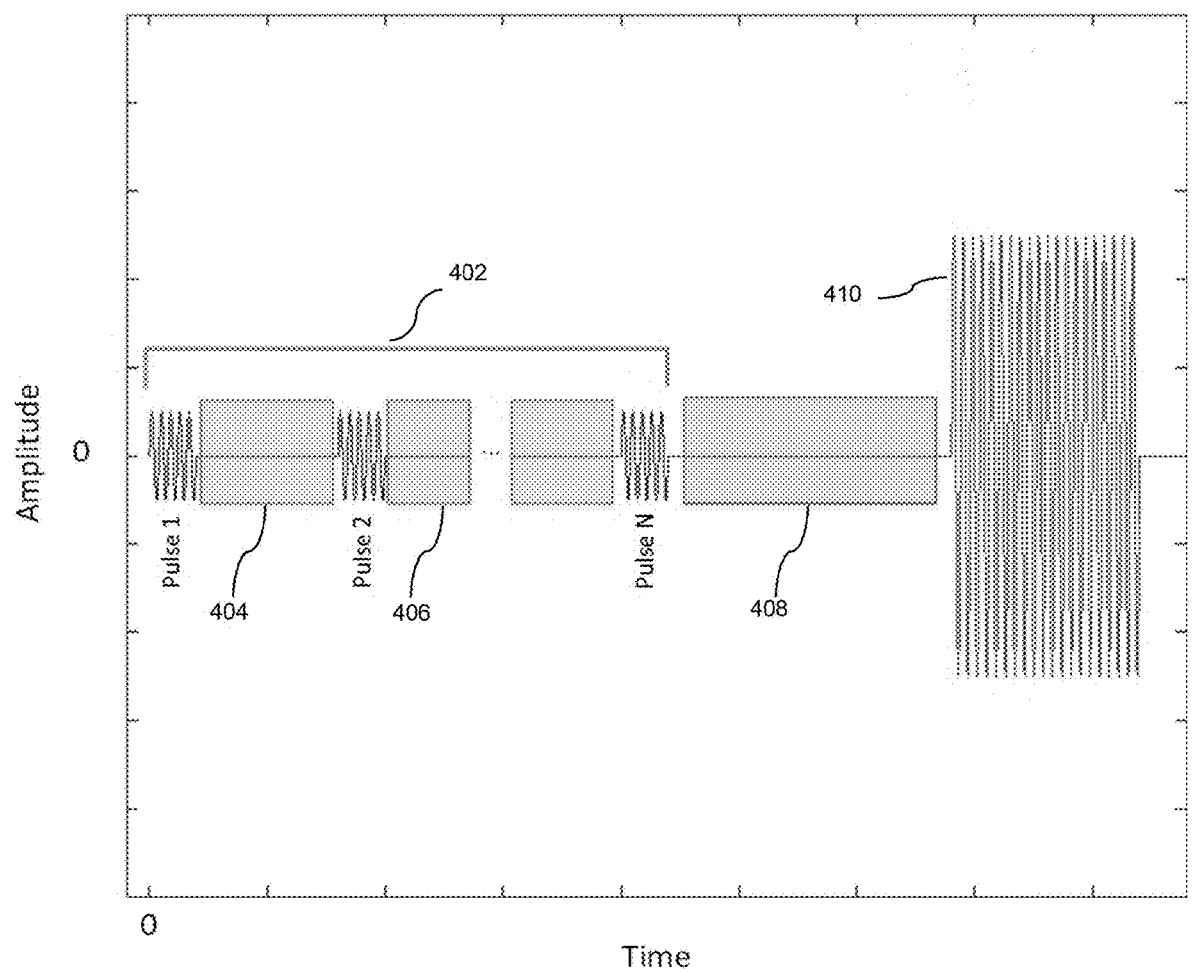
FIG. 4 illustrates an exemplary timing diagram, according to some embodiments of the disclosed invention.

FIG. 4 illustrates an exemplary timing diagram, according to some embodiments of the disclosed invention. A plot of amplitude versus time of the signal pulses is illustrated. During the operation of the system, a complex pulse train 402 is used to transmit an RF signal via wideband transceiver 200 of FIG. 2. In some embodiments, to maximize the data rate through a particular transmit channel, a modulation technique including amplitude, frequency, phase, time, and polarization is used. FIG. 4 shows amplitude versus time of a transmitted signal for a single polarization. Boxes 404, 406, 408 illustrate where the polarization has been switched to an orthogonal polarization—such as if the plot was showing the energy in vertical polarization and the signal is switched to horizontal polarization—to reduce the RF exposure during that period at that polarization by a factor of up to 100 times, which is essentially zero when seen on a linear plot. As time progresses, a criteria, for example the above-mentioned Equation (1), is used to determine the instantaneous FCC power level that has been allocated. If at some point, it is determined, for example, by processor 212 of FIG. 2, that the current power level is below a threshold, then more power can be added to one or more modulation techniques, depicted in FIG. 4, as an increase in amplitude 410. Otherwise, if it is determined that the current instantaneous power level is close to the FCC limit, then the sequence of modulation techniques are themselves modulated, as shown.

As an example, a valid pulse sequence could be modulated as follows: F1, A1, Ph1, Pol1, F2, A2, Ph2, Pol2, etc. This techniques provides a much greater spread spectrum capability in that we have added the concept of a physical dimension to the modulation procedure. As shown, the null (e.g., quiet regions) are in fact amplitude modulations which essentially creates a train of pulses.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A radio frequency (RF) communication system comprising:
    a wideband receiver for receiving an RF signal;
    a wideband receive signal path for processing the received RF signal,
    a wideband transmit signal path for processing a transmit RF signal to be transmitted;
    a wideband transmitter for transmitting the transmit RF signal at a selected transmit frequency and a selected transmit polarization; and
    a processor for controlling a plurality of beam forming circuits for performing signal processing and waveform generation, wherein the processor maximizes an effective radiated power (ERP) of the communication system within a predetermined ERP limit by switching the wideband transmitter between at least one of multiple transmit frequencies and multiple transmit polarizations to form an aggregate, time-averaged signal as the transmit RF signal, wherein the processor further determines a time to switch the selected transmit frequency, as a function of a transmission power of the communication system and the predetermined ERP limit, determines whether the communication system is using different polarization schemes, when it is the time to switch the selected transmit frequency;

switches the wideband transmitter to a new transmit frequency separated from the selected transmit frequency by a predetermined bandwidth, when it is determined that the communication system is not using different polarization schemes;

determines a time to switch the selected transmit polarization, as a function of a transmission power of the communication system and the predetermined ERP limit, when it is determined that the communication system is using different polarization schemes;

switches the wideband transmitter to the new transmit frequency, when it is not the time to switch the selected transmit polarization; and switches the wideband transmitter to a new transmit polarization, when it is the time to switch the selected transmit polarization, to transmit the aggregate, time averaged low power signal at rotating polarizations and frequencies, by the wideband transmitter.

2. The RF communication system of claim 1, wherein the wideband receive signal path includes a wideband bandpass filter to separate two or more carriers or signals in the received RF signal, a wideband amplifier to amplify an output signal from the bandpass filter and an Analog-to-Digital Converter (ADC) to convert an output signal from the wideband amplifier to a digital signal for processing by the processor.

3. The RF communication system of claim 2, wherein the wideband ADC is a monobit ADC.

4. The RF communication system of claim 2, wherein the wideband receive signal path includes an Automatic Gain Controller (AGC) to control an input power into the wideband ADC.

5. The RF communication system of claim 1, wherein the wideband transmit signal path includes a wideband Digital-to-Analog Convertor (DAC) to convert a digital output from a respective beam forming circuit controlled by the processor to an analog signal, a bandpass filter to separate two or more carriers or signals from the analog signal, and a power amplifier to amplify the separated two or more carriers or signals for transmission.

6. The RF communication system of claim 5, wherein the wideband DAC is a monobit DAC.

7. The RF communication system of claim 5, wherein the wideband transmit signal path includes an Automatic Gain Controller (AGC) to control an input power into the power amplifier.

8. The RF communication system of claim 1, wherein the predetermined ERP limit is an EPR limit set by the Federal Communications Commission (FCC).

9. A radio frequency (RF) communication method, the method comprising:

receiving an RF signal by a wideband receiver;
processing the received RF signal by a wideband receive signal path,
processing a transmit RF signal to be transmitted by a wideband transmit signal path;
transmitting the transmit RF signal at a selected transmit frequency and a selected transmit polarization by a wideband transmitter;
controlling a plurality of beam forming circuits for performing signal processing and waveform generation; and
maximizing an effective radiated power (ERP) of the communication system within a predetermined ERP limit by switching the wideband transmitter between at least one of multiple transmit frequencies and multiple transmit polarizations to form an aggregate, time-averaged signal as the transmit RF signal, wherein maximizing the ERP of the communication system within a predetermined ERP limit further comprises:
determining a time to switch the selected transmit frequency, as a function of a transmission power of the wideband transmitter and the predetermined ERP limit,
determining whether the wideband transmitter is using different polarization schemes, when it is the time to switch the selected transmit frequency;
switching the wideband transmitter to a new transmit frequency separated from the selected transmit frequency by a predetermined bandwidth, when it is determined that the wideband transmitter is not using different polarization schemes;
determining a time to switch the selected transmit polarization, as a function of a transmission power of the wideband transmitter and the predetermined ERP limit, when it is determined that the wideband transmitter is using different polarization schemes;
switching the wideband transmitter to the new transmit frequency, when it is not the time to switch the selected transmit polarization; and
switching the wideband transmitter to a new transmit polarization, when it is the time to switch the selected transmit polarization, to transmit the aggregate, time averaged low power signal at rotating polarizations and frequencies, as the transmit RF signal.

10. The RF communication method of claim 9, wherein the time to switch the selected transmit frequency or to switch the selected transmit polarization is determined by the following equation:

$$\frac{\sum_i P_i \cdot d_i \cdot \rho_i}{360,000 \text{ ms}} = 2 \text{ W} \qquad (1)$$

where $P_i$ is transmitted power at duration $d_i$ and at polarization coefficient $\rho_i$.

11. The RF communication method of claim 9, wherein the predetermined ERP limit is an EPR limit set by the Federal Communications Commission (FCC).

12. A radio frequency (RF) transmission system comprising:

a wideband transmit signal path for processing a transmit RF signal to be transmitted;
a wideband transmitter for transmitting the transmit RF signal at a selected transmit frequency and a selected transmit polarization; and
a processor for maximizes an effective radiated power (ERP) of the RF signal to be transmitted within a predetermined ERP limit by:

determining a time to switch the selected transmit frequency, as a function of a transmission power of the transmission system and the predetermined ERP limit, determining whether the transmission system is using different polarization schemes, when it is the time to switch the selected transmit frequency;

switching the wideband transmitter to a new transmit frequency separated from the selected transmit frequency by a predetermined bandwidth, when it is determined that the transmission system is not using different polarization schemes;

determining a time to switch the selected transmit polarization, as a function of a transmission power of the communication system and the predetermined ERP limit, when it is determined that the transmission system is using different polarization schemes;

switching the wideband transmitter to the new transmit frequency, when it is not the time to switch the selected transmit polarization; and switching the wideband transmitter to a new transmit polarization, when it is the time to switch the selected transmit polarization, to transmit an aggregate, time averaged low power signal at rotating polarizations and frequencies, as the transmit RF signal, by the wideband transmitter.

13. The RF transmission system of claim 12, wherein the wideband transmit signal path includes a wideband Digital-to-Analog Convertor (DAC) to convert a digital output from a respective beam forming circuit controlled by the processor to an analog signal, a bandpass filter to separate two or more carriers or signals from the analog signal, and a power amplifier to amplify the separated two or more carriers or signals for transmission.

14. The RF transmission system of claim 13, wherein the wideband DAC is a monobit DAC.

15. The RF transmission system of claim 13, wherein the wideband transmit signal path includes an Automatic Gain Controller (AGC) to allow optimal input power into the power amplifier.

16. The RF transmission system of claim 12, wherein the predetermined ERP limit is an EPR limit set by the Federal Communications Commission (FCC).

17. The RF transmission system of claim 12, wherein the time to switch the selected transmit frequency or to switch the selected transmit polarization is determined by the following equation:

$$\frac{\sum_i P_i \cdot d_i \cdot \rho_i}{360{,}000 \text{ ms}} = 2 \text{ W} \qquad (1)$$

where $P_i$ is transmitted power at duration $d_i$ and at polarization coefficient $\rho_i$.

18. The RF transmission system of claim 12, wherein a radar signal and a communications signal are combined by the wideband transmit signal path, and transmitted by the wideband transmitter.

* * * * *